United States Patent Office 3,468,908
Patented Sept. 23, 1969

3,468,908
HEXAFLUOROISOPROPYLIDENETHIETANES AND THEIR S-OXIDES AND S-DIOXIDES
Maynard S. Raasch, Wilmington, Del., assignor to E. I. du Pont de Nemours and Company, Wilmington, Del., a corporation of Delaware
No Drawing. Continuation-in-part of application Ser. No. 547,435, May 4, 1966. This application Apr. 22, 1968, Ser. No. 723,291
Int. Cl. C07d 61/00
U.S. Cl. 260—327  9 Claims

ABSTRACT OF THE DISCLOSURE

Hexafluoroisopropylidenethietanes formed by reaction of bis(trifluoromethyl)thioketene with an olefinic compound are claimed. Also claimed are hexafluoroisopropylidenethietane S-oxides and S-dioxides formed by contacting these thietanes with oxidizing agents. The thietanes and their S-oxides and S-dioxides are useful as plasticizers for polythiocarbonyl fluoride.

CROSS-REFERENCE TO RELATED APPLICATION

This application is a continuation-in-part of my co-pending coassigned application Ser. N. 547,435, filed May 4, 1966, now abandoned.

FIELD OF THE INVENTION

This invention relates to fluorinated thietanes, their S-oxides, their S-dioxides and to the process for the preparation of the thietanes.

SUMMARY OF THE INVENTION

The product embodiment of this invention is directed to novel hexafluoroisopropylidenethietanes, their S-oxides and their S-dioxides. These compounds are of the formula

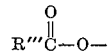

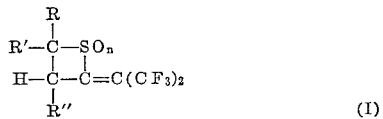
(I)

wherein $n$ is an integer from 0–2; R is selected from the group containing up to 12 carbon atoms consisting of alkanoyloxy and aroyloxy, alkoxy, fluoroalkoxy, alkylthio, aryl, aryloxy, alkoxyaryl, and arylthio; R' is selected from the group consisting of R and hydrogen; R" is selected from the group containing up to 12 carbon atoms consisting of hydrogen, alkoxy, alkylthio and alkyl; R and R' conjointly can be oxygen when R" is selected from hydrogen and alkyl with the proviso that when R" is alkyl, R and R' conjointly is always oxygen; and R and R' conjointly is

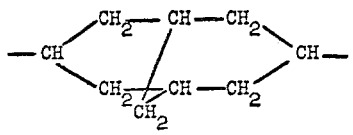

The process embodiment of this invention comprises heating bis(trifluoromethyl)thioketene with an olefinic compound of the formula

(II)

where R, R' and R" are as defined above, at a temperature in the range of —20 to 150° C.

All of the compounds of this invention are useful as plasticizers for poly(thiocarbonyl) fluoride. The plasticized polymer can be fabricated into a self-supporting film.

DESCRIPTION OF THE PREFERRED EMBODIMENTS

The thietanes of this invention are prepared by heating an olefinic compound of Formula II with bis(trifluoromethyl)thioketene. These olefinic compounds are readily obtained by standard organic synthetic techniques and many of these olefinic compounds are commercially available. Included among the olefinic compounds which serve as reactants in this process are aryl and alkyl vinyl ethers wherein the alkyl group is methyl, ethyl, propyl, dodecyl, butyl, tertiary butyl, hexyl, heptyl, decyl, and the like and the aryl group is phenyl, tolly, p-phenylphenyl, naphthyl, and the like; alkyl and aryl vinyl sulfides wherein the alkyl group is methyl, tertiary butyl, dodecyl, and the like, and the aryl group is phenyl, tolyl, naphthyl and the like; ketene acetals wherein the alkyl groups are methyl, ethyl, butyl, octyl, decyl, dodecyl and the like; vinyl esters such as vinyl acetate, vinyl propionate, vinyl butyrate, vinyl dodecanoate, vinyl p-toluate, vinyl benzoate, vinyl naphthoate and the like; styrene, α-methylstyrene, p,t-butylstyrene, 1,1-diphenylethylene, p-methoxystyrene, p-methylstyrene and the like; and ketene and aldoketenes such as methyl, ethyl, propyl and dodecylketene and the like; disubstituted ethylenes such as 1,2-di(methylthio)ethylene, 1-methoxy-2-dodecylthioethylene, 1,2-di(dodecyloxy)ethylene and the like; and methyleneadamantane. Alkanoyloxy and aroyloxy substituted vinyl compounds can also be used. Alkanoyloxy and aroyloxy which are also commonly called acyloxy consist of the group $$R'''\overset{O}{\underset{\|}{C}}-O-$$

where R''' contains up to 11 carbons and is an alkyl or aryl group.

The reaction of ketene with bis(trifluoromethyl) thioketene produces the product wherein the R and R' substituents of I conjointly is oxygen and R" is hydrogen. The reaction with an aldoketene produces products wherein R and R' conjointly is oxygen and R" is alkyl. When R" is alkyl, and R and R' conjointly is oxygen.

The reaction of bis(trifluoromethyl)thioketene generally follows the Markownikoff addition rule with the sulfur atom adding to the most substituted carbon of the carbon-carbon double bond.

A mixture of isomers can be obtained when the olefinic reactant is unsymmetrical and carbons thereof contain an equal number of substituents. For example, the reaction 1-methoxy-2-ethoxy-ethylene and bis(trifluoromethyl)ketene can give a mixture of isomeric products.

Bis(trifluoromethyl)thioketene used in this invention is a new compound which has been described in U.S. 3,275,609.

The process of this invention is generally carried out at temperatures of —20 to 150° C. The reaction can be conducted at atmospheric pressure or at superatmospheric pressure such as in a closed reactor under autogenous pressures. Preparation can be conducted either in batch processes or in continuous processes utilizing operable temperatures and pressures.

The proportion in which the reactants can be brought together to carry out the process of this invention is not critical and can be varied widely. High yields of the thietane products, based on bis(trifluoromethyl)ketene, are obtained when the molar ratio of the olefinic compound to the bis(trifluoromethyl)ketene is 1:1–4:1 and this represents the preferred proportions. However, ratios in the range from 10:1 to 1:5 are operable for producing at least some product.

The reaction can be carried out in the presence or absence of a liquid solvent medium which is inert to the reactants and the product. Such inert solvents include hydrocarbons, or halogenated hydrocarbons such as hexane, cyclohexane, benzene, toluene, dichloromethane, carbon tetrachloride, dichlorotetrafluoroethane, chlorobenzene and the like. The thietane products can be isolated and purified by distillation and/or crystallization techniques. The thietanes are thermally stable, relatively nonvolatile liquids and solids.

The process embodiment of this invention for producing the thietane S-oxides and the thietane S-dioxides comprises contacting a thietane with an oxidizing agent. Oxidizing agents which can be used include hydrogen peroxide, peracetic acid, perbenzoic acid, chromium trioxide, potassium permanganate and the like. Thietane S-oxides, which are also called sulfoxides, are produced when the ratio of the equivalents of oxidizing agent to moles of thietane is about 2. Thietane S-dioxides, which are also called sulfones, can be produced when the ratio of the equivalents of oxidizing agent to moles of thietane is about 4 or greater. Thietane S-dioxides can also be produced by completely oxidizing thietane S-oxide with at least 2 equivalents of oxidizing agent. An equivalent weight of oxidizing agent is the gram-molecular weight divided by the total change in valence of all atoms in the molecule which changes valence.

The oxidation process is generally run at a temperature of 0–100° C. Solvents such as acetone and acetic acid can be used. Aqueous solutions of the oxidizing agent can be used. Peracetic acid, prepared from 30% hydrogen peroxide and acetic acid is a preferred oxidizing agent. S-dioxides are generally thermally stable products which are less volatile than the unoxidized thietane. These products can be isolated by distillation under reduced pressure and/or crystallization.

The following examples further illustrate the invention.

EXAMPLE 1

2-ethoxy-4-hexafluoroisopropylidenethietane

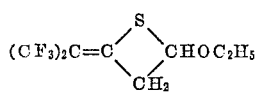

Ethyl vinyl ether (6.8 g., 0.095 mole) was cooled in ice and 5.5 g. (0.028 mole) of bis(trifluoromethyl)thioketene was slowly added with stirring. Distillation of the product gave 6.8 g. (90% yield) of the thietane, B.P. 70–72° C. at 7 mm., $n_D^{25}$ 1.4173.

Analysis.—Calcd. for $C_8H_8F_6OS$: C, 36.10; H, 3.03; S, 12.07. Found: C, 36.10; H, 3.09; S, 12.32.

In confirmation of the structure, the $F^{19}$ n.m.r. spectrum shows two quadruplets. The peaks of one quadruplet are further split to triplets by the adjacent $CH_2$ group.

EXAMPLE 2

2-(2,2,2-trifluoroethoxy)-4-hexafluoroisopropylidenethietane

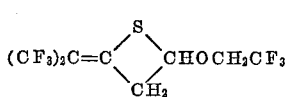

To 8.8 g. (0.07 mole) of 2,2,2-trifluoroethyl vinyl ether was added 6.9 g. (0.035 mole) of bis(trifluoromethyl) thioketene and the mixture was allowed to stand for 20 hours. Distillation gave 9.0 g. (80% yield) of the thietane, B.P. 79–82° C. at 11 mm., $n_D^{25}$ 1.3893.

Analysis.—Calcd. for $C_8H_5F_9OS$: C, 30.01; H, 1.57; S, 10.01. Found: C, 30.74; H, 2.06; S, 9.85.

The process of Example 2 can be used to prepare other fluoroalkyloxy substituted thietanes using $$CH_2{=}CH{-}OCH_2(CF_2CF_2)_pH$$

where p is 1–5.

EXAMPLE 3

2,2-diethoxy-4-hexafluoroisopropylidenethietane

To ketene diethyl acetal dissolved in five volumes of pentane was added an equimolar amount of bis(trifluoromethyl)thioketene with cooling to keep the temperature at 15–25° C. Distillation of the product gave an 81% yield of the thietane, B.P. 73–74° C. at 1.7 mm., $n_D^{25}$ 1.4202.

Analysis.—Calcd. for $C_{10}H_{12}F_6O_2S$: C, 38.80; H, 3.90; S, 10.33. Found: C, 38.85; H, 4.01; S, 10.49.

EXAMPLE 4

2-hexafluoroisopropylidene-3,4-dimethoxythietane

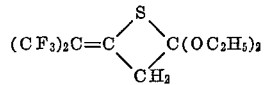

To 2.1 g. (0.024 mole) of 1,2-dimethoxyethylene in 10 ml. of dichloromethane was added 4.7 g. (0.024 mole) of bis(trifluoromethyl)ketene with cooling to keep the temperature below 35° C. Distillation gave 4.76 g. (71% yield) of the thietane, B.P. 104–105° C. at 15 mm. The white compound was recrystallized from hexane and melted at 41.7–42° C.

Analysis.—Calcd. for $C_8H_8F_6O_2S$: C, 34.05; H, 2.86; S, 11.36. Found: C, 34.09; H, 2.99; S, 11.83.

In conformity with the structure, the $F^{19}$ n.m.r. spectrum consisted of two quadruplets.

EXAMPLE 5

2-tert-butylthio-4-hexafluoroisopropylidenethietane

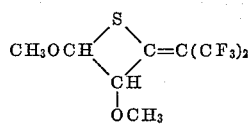

To 5 g. (0.043 mole) of tert-butyl vinyl sulfide was added 5.82 g. (0.03 mole) of bis(trifluoromethyl)thioketene at 10–15° C. The product was distilled to give 8.4 g. (61% yield) of the thietane, B.P. 114° C. at 10 mm. $n_D^{25}$ 1.4583.

Analysis.—Calcd. for $C_{10}H_{12}F_6S_2$: C, 38.70; H, 3.90; S, 20.66. Found: C, 38.65; H, 4.16; S, 20.87.

The n.m.r. spectra were analogous to those for the compound of Example 1.

EXAMPLE 6

4-hexafluoroisopropylidene-2-thietanyl acetate

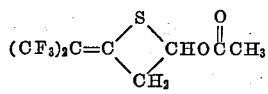

Vinyl acetate (5.16 g., 0.06 mole) and 7.76 g. (0.04 mole) of bis(trifluoromethyl)thioketene were sealed in a glass tube and heated at 100° C. for 15 hours. The product was cooled, solid dimer of the thioketene was removed by filtration, and the filtrate was distilled to give 2.76 g. (25% yield) of the thietane, B.P. 93–96° C. at 11 mm., $n_D^{25}$ 1.4180.

Analysis.—Calcd. for $C_8H_6F_6O_2S$: C, 34.29; H, 2.16; S, 11.44. Found: C, 34.03; H, 2.09; S, 11.67.

The $F^{19}$ n.m.r. spectrum shows two quadruplets, the one in the low field being split further by the $CH_2$ group.

EXAMPLE 7

4-hexafluoroisopropylidene-2-thietanyl benzoate

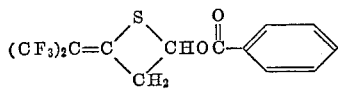

Equimolar amounts of vinyl benzoate and bis(trifluoromethyl)thioketene were sealed in a glass tube and heated at 100° C. for 16 hours. The solid product was next heated at 100° C. under vacuum to remove dimer of the thioketene by vaporization and then blotted on paper to remove liquid vinyl benzoate. Finally, the compound was recrystallized from cyclohexane to give the thietane ester in 46% yield, M.P. 102–102.6° C.

Analysis.—Calcd. for $C_{13}H_8F_6O_2S$: C, 45.61; H, 2.36; S, 9.37. Found: C, 46.03; H, 2.30; S, 9.14.

EXAMPLE 8

2-hexafluoroisopropyidene-4-phenylthietane

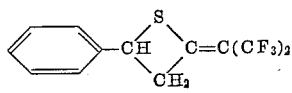

Bis(trifluoromethyl)thioketene (7.76 g., 0.04 mole) and 7.28 g. (0.07 mole) of styrene containing a trace of hydroquinone were heated in a sealed glass tube at 100° C. for 16 hours. Methanol was added to the product to precipitate polymer (polystyrene). The polymer was filtered off and the filtrate was distilled to give 3.1 g. (26% yield) of the thietane, B.P. 67° C. at 0.2 mm., $n_D^{25}$ 1.4946.

Analysis.—Calcd. for $C_{12}H_8F_6S$: C, 48.32; H, 2.70; S, 10.75. Found: C, 48.43; H, 2.77; S, 10.80.

In agreement with the structure given, the infrared spectrum has a band at 6.05μ for the exocyclic double bond. The $F^{19}$ n.m.r. spectrum has two quadruplets and the $H^1$ n.m.r. spectrum has for $CH_2$ a broad band resulting from splitting by the the $CF_3$ groups.

EXAMPLE 9

2-hexafluoroisopropylidene-4-(p-methoxyphenyl) thietane

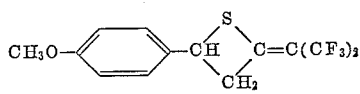

Bis(trifluoromethyl)thioketene was added with cooling to an equimolar amount of p-methoxystyrene. Distillation of the product gave a 69% yield of the thietane, B.P. 98° C. at 0.1 mm., $n_D^{25}$ 1.5060, M.P. 23–24° C.

Analysis.—Calcd. for $C_{13}H_{10}F_6OS$: C, 47.55; H, 3.07; S, 9.77. Found: C, 46.98; H, 2.78; S, 9.91.

The infrared spectrum has a band at 6.06μ indicative of the exocyclic double bond.

EXAMPLE 10

2-hexafluoroisopropylidene-4-(p-methoxyphenyl) thietane 1,1-dioxide

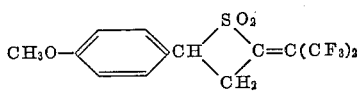

To 6.56 g. (0.02 mole) of the thietane of Example 9 dissolved in 25 ml. of acetic acid was added 6.2 ml. (0.03 mole) of 30% hydrogen peroxide and the mixture was heated for two hours on a steam bath. The excess hydrogen peroxide was destroyed by adding 5% ruthenium-on-carbon catalyst and the filtered solution was evaporated to dryness. The residue was recrystallized from hexane to give 4.71 g. (72% yield) of the sulfone, M.P. 97–97.5° C.

Analysis.—Calcd. for $C_{13}H_{10}F_6O_3S$: C, 43.33; H, 2.80; S, 8.90. Found: C, 43.29; H, 2.83; S, 9.03.

EXAMPLE 11

2,2-diphenyl-4-hexafluoroisopropylidenethietane

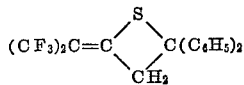

Equimolar amounts of 1,1-diphenylethylene and bis(trifluoromethyl)thioketene were heated in a sealed glass vessel at 100° C. for 15 hours. The thietane was recrystallized from methanol and obtained in 65% yield, M.P. 59° C.

Analysis.—Calcd. for $C_{18}H_{12}F_6S$: C, 57.72; H, 3.23; S, 8.56. Found: C, 57.49; H, 3.11; S, 8.56.

In agreement with the structure, the $F^{19}$ n.m.r. spectrum has two quadruplets. The $H^1$ n.m.r. spectrum has a multiplet for $CH_2$ that indicates splitting because of the $CF_3$ groups. The infrared spectrum shows a band at 6.07μ for the exocyclic double bond.

EXAMPLE 12

4-hexafluoroisopropylidenethietan-2-one

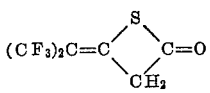

Excess ketene ($CH_2$=C=O) was bubbled into a solution of bis(trifluoromethyl)thioketene dissolved in six volumes of dichloromethane and maintained at 0° C. After the solution had stood for 16 hours at 0° C. it was fractionated to give a 44% yield of the thietanone, B.P. 151–153° C., $n_D^{25}$ 1.4181.

Analysis.—Calcd. for $C_6H_2F_6OS$: C, 30.51; H, 0.85; S, 13.57. Found: C, 30.93; H, 1.45; S, 13.60.

The infrared spectrum shows absorption at 5.49μ for C=O and at 5.99μ for C=C. The $F^{19}$ n.m.r. spectrum has two quadruplets, the components of one of which are further split to triplets by the adjacent $CH_2$ group.

The compound was converted to a tacky polymer by a trace of a tertiary amine.

EXAMPLE 13

4-hexafluoroisopropylidene-3-methylthietan-2-one

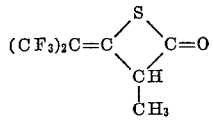

Bis(trifluoromethyl)thioketene was added at 0° C. to a solution of methylketene in ether prepared according to Staudinger, Ber. 44, 533 (1911). After one hour at 0° C. the mixture was distilled to give the thietane, B.P. 63–64° C. at 26 mm., $n_D^{25}$ 1.4108.

Analysis.—Calcd. for $C_7H_4F_6OS$: C, 33.61; H, 1.61; S, 12.82. Found: C, 33.01; H, 1.87; S, 12.79.

EXAMPLE 14

2-hexafluoroisopropylidene-4-phenylthiothietane

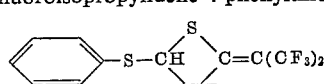

Bis(trifluoromethyl)thioketene was added with cooling to an equimolar amount of phenyl vinyl sulfide. Distillation of the products gave an 81% yield of the thietane, B.P. 72° C. at 0.06 mm., $n_D^{25}$ 1.5198.

*Analysis.*—Calcd. for $C_{12}H_8F_6S_2$: C, 43.63; H, 2.44; S, 19.42. Found: C, 43.98; H, 2.58; S, 19.43.

The n.m.r. spectra are analogous to those for the other examples.

EXAMPLE 15

2-hexafluoroisopropylidene-4-methyl-4-phenylthietane

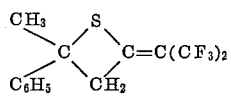

A mixture of 3.90 g. (0.035 mole) of α-methylstyrene and 5.82 g. (0.03 mole) of bis(trifluoromethyl)thioketene was allowed to stand for 20 hours. Distillation gave 6.1 g. of a mixture, B.P. 60° C. at 0.05 mm., of the above thietane and 3,3,3-trifluoro-2-(trifluoromethyl)propenyl 2-phenylallyl sulfide. These compounds were separated on a gas chromatography column containing 20% of octylphenoxypolyethyleneoxyethanol on firebrick at 175° C. The thietane came off first and comprised 61% of the mixture. Refractive index, $n_D^{25}$ 1.4875.

*Analysis.*—Calcd. for $C_{13}H_{10}F_6S$: C, 50.00; H, 3.23; S, 10.27. Found: C, 50.18; H, 3.19; S, 10.31.

In confirmation of the structure, the n.m.r. spectrum of a neat sample shows a singlet at 1.44 p.p.m. for $CH_3$, a peak at 3.53 p.p.m. for $CH_2$ broadened by the splitting effect of the fluorine atoms, and a singlet at 6.85 p.p.m. for $C_6H_5$.

EXAMPLE 16

4'-[2,2,2-trifluoro-1-(trifluoromethyl)ethylidene] spiro[adamantane-2,2'-thietane]

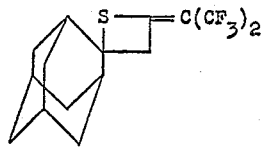

2-methyleneadamantane (4.44 g., 0.03 mole) and 6.40 g. (0.033 mole) of bis(trifluoromethyl)thioketene were sealed in a glass tube and heated at 100° C. for 15 hours. The cooled product was filtered from bis(trifluoromethyl)thioketene dimer and unreacted 2-methyleneadamantane. Distillation of the filtrate gave 4.1 g. (40% yield) of the above thietane, B.P. 78–79° C. at 0.05 mm. After recrystallization from methanol, the compound melted at 39.5–40.5° C.

*Analysis.*—Calcd. for $C_{15}H_{16}C_6S$: C, 52.61; H, 4.71; S, 9.36. Found: C, 52.41; H, 4.66; S, 9.30.

In support of the structure, the infrared spectrum shows absorption at 6.10μ for C=C. The n.m.r. spectrum in $CDCl_3$ shows no protons attached to unsaturated carbon. The band at 3.59 p.p.m. for the $CH_2$ group of the thietane ring is split to a septuplet by the $CF_3$ groups.

Additional illustrative compounds of the invention are given in the Table below. The reactants in parentheses in the left-hand column of the Table can be reacted with bis(trifluoromethyl)thioketene to give the product listed by formula in the right-hand column and named in the left-hand column of the table.

TABLE

| Compound | Formula |
|---|---|
| 2-hexafluoroisopropylidene-4-phenoxythietane (from phenyl vinyl ether). | ![phenyl]–OCH(S)(CH₂)C=C(CF₃)₂ |
| 2-hexafluoroisopropylidene-4,4-dioctyloxythietane (from ketene dioctyl acetal). | $(C_8H_{17}O)_2C$(S)(CH₂)C=C(CF₃)₂ |
| 2-hexafluoroisopropylidene-3,4-dibutoxythietane (from 1,2-dibutoxyethylene). | $C_4H_9OCH$(S)(CH(OC₄H₉))C=C(CF₃)₂ |
| 2-hexafluoroisopropylidene-4-(2,2,3,3-tetrafluoropropoxy)thietane (from 2,2,3,3-tetrafluoropropyl vinyl ether). | $HCF_2CF_2CH_2OCH$(S)(CH₂)C=C(CF₃)₂ |
| 2-hexafluoroisopropylidene-4-(p-tolyl)thietane (from p-methylstyrene). | $CH_3$–⟨⟩–CH(S)(CH₂)C=C(CF₃)₂ |
| 2-hexafluoroisopropylidene-4-decylthiothietane (from decyl vinyl sulfide). | $C_{10}H_{21}SCH$(S)(CH₂)C=C(CF₃)₂ |
| 2-hexafluoroisopropylidene-4-thietanyl valerate (from vinyl valerate). | $C_4H_9COOCH$(S)(CH₂)C=C(CF₃)₂ |
| 2-hexafluoroisopropylidene-3,4-dipropylthiothietane (from 1,2-bis(propylthio)-ethylene). | $C_3H_7SCH$(S)(CH(SC₃H₇))C=C(CF₃)₂ |
| 2-hexafluoroisopropylidene-4-p-biphenylthietane (from p-phenylstyrene). | ⟨⟩–⟨⟩–CH(S)(CH₂)C=C(CF₃)₂ |

The compounds of this invention are useful as plasticizers for polythiocarbonyl fluoride, $(CF_2S)_x$. This polymer is deficient in flow properties. It crystallizes at room temperature and during crystallization changes from an elastomeric to a rigid form. The present compounds increase the flowability of the polymer in molding operations and inhibit the loss of desirable elastic properties. The plasticizer may be incorporated into the polymer by soaking four parts of polymer in a solution of one part of a compound of this invention dissolved in 1.5 parts of chloroform. The swollen polymer is then dried at 80° C. and may be molded at 150° C. to form self-supporting films.

The plasticizing effects of the compounds are not limited to the above specialty polymer. Vinyl polymers and rubbers may also be plasticized with them.

The foregoing detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property or privilege is claimed are defined as follows.

I claim:
1. A compound of the formula

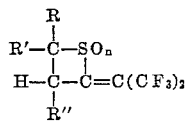

wherein $n$ is an integer from 0–2; R is selected from the group containing up to 12 carbon atoms consisting of alkanoyloxy and aroyloxy, alkoxy, fluoroalkoxy, alkylthio, aryl, aryloxy, alkoxyaryl, and arylthio; R' is selected from the group consisting of R and hydrogen; R" is selected from the group containing up to 12 carbon atoms consisting of hydrogen, alkoxy, alkylthio and alkyl; R and R' conjointly can be oxygen when R" is selected from hydrogen and alkyl with the proviso that when R" is alkyl, R and R' conjointly is always oxygen; and R and R' conjointly is

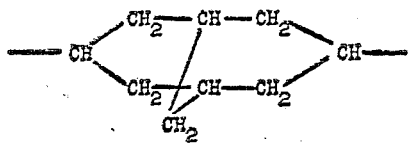

2. The compound of claim 1 wherein $n$ is 0 and R is ethoxy, R' and R" are hydrogen; said compound being 2-ethoxy-4-hexafluoroisopropylidenethietane.

3. The compound of claim 1 wherein $n$ is 0 and R and R' are ethoxy, R" is hydrogen; said compound being 2,2-diethoxy-4-hexafluoropropylidenethietane.

4. The compound of claim 1 wherein $n$ is 0 and R is acetoxy, R' and R" are hydrogen; said compound being 4-hexafluoroisopropylidene-2-thietanyl acetate.

5. The compound of claim 1 wherein $n$ is 0, R and R" are methoxy, and R' is hydrogen; said compound being 2-hexafluoroisopropylidene-3,4-dimethoxythietane.

6. The compound of claim 1 wherein $n$ is 2, R is p-methoxyphenyl, R' and R" are hydrogen and $n$ is 2; said compound being 2-hexafluoroisopropylidene-4-(p-methoxyphenyl)thietane 1,1-dioxide.

7. The compound of claim 1 wherein R and R' conjointly are oxygen, R" is methyl and $n$ is 0; said compound being 4-hexafluoroisopropylidene-3-methylthietane-2-one.

8. Process for preparing a hexafluoroisopropylidenethietane of claim 1 comprising reacting bis(trifluoromethyl)thioketene with an olefinic compound of the formula

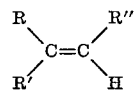

wherein R, R' and R" are as defined in claim 1, at a temperature range of −20° to 150° C. and thereafter recovering said hexafluoroisopropylidenethietane.

9. Process of claim 8 wherein the reaction is conducted in a liquid solvent medium inert to the reactants and products.

References Cited
UNITED STATES PATENTS
3,406,184  10/1968  Raasch _____ 260—327

HENRY R. JILES, Primary Examiner
C. M. SHURKO, Assistant Examiner

U.S. Cl. X.R.
260—30.2

PO-1050
(5/69)

UNITED STATES PATENT OFFICE
CERTIFICATE OF CORRECTION

Patent No. 3,468,908     Dated September 23, 1969

Inventor(s) Maynard S. Raasch

It is certified that error appears in the above-identified patent and that said Letters Patent are hereby corrected as shown below:

Col. 2, line 16, "tolly" should be -- tolyl --;

Col. 9, line 20, insert a comma between "described" and "for";

Col. 10, Claim 6, correct the claim to read:

-- 6. The compound of claim 1 wherein n is 2, R is p-methoxyphenyl, and R' and R" are hydrogen; said compound being 2-hexafluoroisopropylidene-4-(p-methoxyphenyl)-thietane 1,1-dioxide. --.

SIGNED AND
SEALED
APR 28 1970

(SEAL)
Attest:

Edward M. Fletcher, Jr.
Attesting Officer

WILLIAM E. SCHUYLER, JR.
Commissioner of Patents